United States Patent
Tanaka et al.

(10) Patent No.: US 7,452,955 B2
(45) Date of Patent: Nov. 18, 2008

(54) ONE PART ORGANOPOLYSILOXANE GEL COMPOSITION

(75) Inventors: Miyuki Tanaka, Gunma-ken (JP); Kazuyasu Sato, Gunma-ken (JP); Masayuki Ikeno, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 212 days.

(21) Appl. No.: 11/209,768

(22) Filed: Aug. 24, 2005

(65) Prior Publication Data

US 2006/0047097 A1     Mar. 2, 2006

(30) Foreign Application Priority Data

Aug. 25, 2004   (JP)   ............... 2004-245345

(51) Int. Cl.
C08G 77/06 (2006.01)
C08G 77/12 (2006.01)
C08G 77/00 (2006.01)
C08L 83/04 (2006.01)

(52) U.S. Cl. ............... 528/15; 528/31; 528/23; 524/588

(58) Field of Classification Search ............ 528/15
See application file for complete search history.

(56) References Cited

U.S. PATENT DOCUMENTS

| | | |
|---|---|---|
| 3,188,300 A | 6/1965 | Chalk |
| 3,445,420 A | 5/1969 | Kookootsedes et al. |
| 3,453,234 A | 7/1969 | Kookootsedes et al. |
| 3,814,730 A | 6/1974 | Karstedt |
| 4,061,609 A | 12/1977 | Bobear |
| 4,288,345 A | 9/1981 | Ashby et al. |
| 4,329,275 A | 5/1982 | Hatanaka et al. |
| 4,584,361 A | 4/1986 | Janik et al. |
| 5,204,384 A * | 4/1993 | Matsushita et al. ......... 523/211 |
| 5,426,200 A * | 6/1995 | Dauth et al. .................. 556/9 |
| 6,300,455 B1 | 10/2001 | Haselhorst et al. |
| 6,346,562 B1 | 2/2002 | Haselhorst et al. |
| 2004/0116561 A1* | 6/2004 | Ikeno et al. ................. 524/115 |

FOREIGN PATENT DOCUMENTS

| | | |
|---|---|---|
| DE | 11 668 159 | 9/1971 |
| EP | 1 437 382 A1 | 7/2004 |
| JP | 46-28795 | 8/1971 |
| JP | 51-8926 | 3/1976 |
| JP | 56-20051 A | 2/1981 |
| JP | 57-136655 A | 10/1981 |
| JP | 55-423 B2 | 1/1990 |
| JP | 2001-508096 A | 6/2001 |
| JP | 2001-527111 A | 12/2001 |
| JP | 2004-204225 A | 7/2004 |
| WO | WO 98/29497 | 7/1998 |

* cited by examiner

*Primary Examiner*—Randy Gulakowski
*Assistant Examiner*—Robert Loewe
(74) *Attorney, Agent, or Firm*—Birch, Stewart, Kolasch & Birch, LLP

(57) ABSTRACT

In a one part organopolysiloxane gel composition comprising an alkenyl-containing branched organopolysiloxane, an SiH-terminated organohydrogenpolysiloxane, and an addition reaction catalyst, the catalyst is obtained by heat aging a mixing of a platinum complex having an alkenyl-containing silane or organosiloxane as a ligand, a phosphite, and an organohydrogenpolysiloxane at 30-120° C. and an organic peroxide is concomitantly used. The composition inhibits addition reaction at room temperature, maintains storage stability over a long period, yet can cure rapidly at moderate temperature.

5 Claims, No Drawings

ONE PART ORGANOPOLYSILOXANE GEL COMPOSITION

CROSS-REFERENCE TO RELATED APPLICATION

This non-provisional application claims priority under 35 U.S.C. §119(a) on patent application No. 2004-245345 filed in Japan on Aug. 25, 2004, the entire contents of which are hereby incorporated by reference.

1. Technical Field

This invention relates to a one-part organopolysiloxane gel composition and more particularly, to a one-part organopolysiloxane gel composition which has good long-term storage stability at room temperature, yet cures at moderate temperature within a short time as compared with the prior art.

2. Background Art

Addition reaction curable organopolysiloxane compositions, simply referred to as compositions, are known in the art comprising an organopolysiloxane having an alkenyl group (typically vinyl) bonded to a silicon atom, an organohydrogenpolysiloxane having a hydrogen atom bonded to a silicon atom (SiH group), and a platinum group catalyst wherein the compositions cure through addition reaction (hydrosilylation reaction) of SiH groups to vinyl groups. It is well known to compound various addition reaction inhibitors in the compositions along with the platinum group catalysts for inhibiting the progress of curing through addition reaction at room temperature for improving long-term storage stability, yet allowing the compositions on use to cure by heating to accelerate the addition reaction. Exemplary addition reaction inhibitors known to be compounded in such compositions include acetylenic compounds (U.S. Pat. No. 3,445,420), sulfoxide compounds (U.S. Pat. No. 3,453,234), and hydroperoxide compounds (U.S. Pat. No. 4,061,609).

However, when an organohydrogenpolysiloxane having an SiH group at the end of the molecular chain is used, compounding of the above-described inhibitors fails to effectively inhibit the progress of curing of the compositions through addition reaction at room temperature. The compositions are thus insufficient in storage stability. In the event the organohydrogenpolysiloxane having an SiH group at the end of the molecular chain is combined with an alkenyl-containing organopolysiloxane of branched structure, more difficulties arise in imparting long-term storage stability at room temperature to such compositions.

To solve these problems, U.S. Pat. No. 4,584,361 describes the use of amine compounds such as n-butylamine, N,N-dibutylaminopropylamine and N,N,N',N'-tetramethylethylenediamine as the inhibitor for inhibiting addition reaction at room temperature of a composition comprising a vinyl-containing branched organopolysiloxane and an SiH group-terminated organohydrogenpolysiloxane. However, these amine compounds are less storage stable in open systems because of their low boiling point. If the compositions are loaded with inorganic fillers, the amine compounds are adsorbed to the surface of inorganic fillers so that the addition reaction-inhibiting effect is substantially negated.

U.S. Pat. No. 3,188,300, U.S. Pat. No. 6,300,455 (WO 98/29497 or JP-A 2001-508096), and JP-A 2001-527111 corresponding to U.S. Pat. No. 6,346,562 disclose compositions having phosphate esters compounded as the addition reaction inhibitor. JP-A 56-20051 corresponding to U.S. Pat. No. 4,329,275 describes the use of a phosphorus compound and an organic peroxide as the addition reaction inhibitor.

JP-A 2004-204225 corresponding to EP 1437382 A discloses that a combination of a phosphite with an organic peroxide is effective for controlling addition reaction at room temperature of a composition comprising a SiH group-terminated organohydrogenpolysiloxane and an alkenyl group-containing branched structure organopolysiloxane. This composition exhibits long-term storage stability, but is still insufficient with respect to brief cure at moderate temperature.

SUMMARY OF THE INVENTION

The present invention addresses a composition comprising a SiH group-terminated organohydrogenpolysiloxane, an alkenyl group-containing branched structure organopolysiloxane. An object of the present invention is to provide such a one part organopolysiloxane gel composition which effectively inhibits addition reaction at room temperature even when the composition is loaded with an inorganic filler, maintains storage stability over a long period of time, yet cures at moderate temperature within a short time, as compared with the prior art compositions.

Regarding a one part organopolysiloxane gel composition comprising an alkenyl group-containing branched structure organopolysiloxane, an organohydrogenpolysiloxane having a silicon-bonded hydrogen atom at the end of the molecular chain, and a platinum group catalyst for promoting addition reaction, the inventors have discovered that the use as the addition reaction catalyst of a product obtained by heating and aging at a temperature of 30 to 120° C. a mixture of a platinum complex having an alkenyl group-containing silane or alkenyl group-containing organosiloxane as a ligand, a phosphate, and an organohydrogenpolysiloxane having a silicon-bonded hydrogen atom in specific amounts and the concomitant use of an organic peroxide ensure that the composition inhibits addition reaction at room temperature, maintains storage stability over a long period of time, yet can cure at moderate temperature within a short time, as compared with the prior art compositions.

None of the above-cited patents describe that when a phosphate is used as the addition reaction inhibitor, it is effective for inhibiting addition reaction at room temperature of a composition comprising an SiH group-terminated organohydrogenpolysiloxane. Likewise, none of the patents describe that for a composition comprising a SiH group-terminated organohydrogenpolysiloxane in combination with an alkenyl group-containing branched structure organopolysiloxane, a phosphite or a combination of a phosphite with an organic peroxide can inhibit addition reaction at room temperature.

According to the invention, there is provided a one-part organopolysiloxane gel composition comprising (A) 100 parts by weight of an organopolysiloxane consisting of 80.0 to 97.0 mol % of $R_2SiO$ units, 1.0 to 10.0 mol % of $RSiO_{1.5}$ units, 0.1 to 4.0 mol % of $(CH_3)_2(CH_2\!=\!CH)SiO_{0.5}$ units, and 0.5 to 10.0 mol % of $(CH_3)_3SiO_{0.5}$ units, a total of these units being 100 mol %, wherein R is methyl, phenyl or a group of the formula: $RfCH_2CH_2\!-\!$, Rf is a perfluoroalkyl group which may have an ether-bonding oxygen atom in the chain, a plurality of R's in one molecule may be the same or different, (B) an organohydrogenpolysiloxane represented by the average compositional formula (1):

$$R^1_a H_b SiO_{(4-a-b)/2} \qquad (1)$$

wherein $R^1$ is a substituted or unsubstituted monovalent hydrocarbon group free of aliphatic unsaturation, a is a positive number of 0.7 to 2.2, b is a positive number of 0.001 to 1.0, and a+b is from 0.8 to 3.0, said organohydrogenpolysiloxane having at least one hydrogen atom directly bonded to a silicon atom at an end of the molecular chain, in an amount to provide 0.1 to 5 silicon-bonded hydrogen atoms per vinyl group in component (A), (C) an addition reaction catalyst obtained by heating and aging a mixture of components (C-1) to (C-3) at a temperature of 30 to 120° C., in an amount to provide 0.1 to 1,000 ppm of platinum atoms based on the total weight of components (A) and (B), (C-1) a platinum complex having an alkenyl group-containing silane or alkenyl group-containing organosiloxane as a ligand, in an amount of 1 equivalent of platinum atoms in the platinum complex, (C-2) a phosphite having the general formula (2):

$$P(OR^2)_3 \tag{2}$$

wherein $R^2$ is independently at least one group selected from the class consisting of a substituted or unsubstituted monovalent hydrocarbon group and a group of the formula: —R$_3$—[O—P(OR$^6$)$_2$]$_x$ wherein $R^6$ is independently a substituted or unsubstituted monovalent hydrocarbon group, x is an integer of 1 to 3, $R^3$ is a di- to tetra-valent $C_2$-$C_{20}$ hydrocarbon group which may have an ether-bonding oxygen atom in the chain, or the general formula (2'):

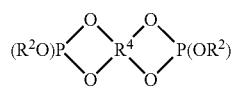

(2')

wherein $R^2$ is as defined above, $R^4$ is a tetravalent $C_1$-$C_{20}$ hydrocarbon group which may have an ether-bonding oxygen atom in the chain, in an amount of 1 to 10 equivalents of phosphorus atoms, and (C-3) an organohydrogenpolysiloxane represented by the average compositional formula (3):

$$R^5{}_cH_dSiO_{(4-c-d)/2} \tag{3}$$

wherein $R^5$ is a substituted or unsubstituted monovalent hydrocarbon group free of aliphatic unsaturation, c is a positive number of 0.7 to 2.2, d is a positive number of 0.001 to 1.0, and c+d is from 0.8 to 3.0, said organohydrogenpolysiloxane having at least one hydrogen atom bonded to a silicon atom, in an amount of 1 to 100 equivalents of silicon-bonded hydrogen atoms, and (D) an organic peroxide in an amount of at least 2 equivalents per equivalent of the phosphite in component (C).

It is noted that the phrase "$C_1$-$C_{20}$" as used herein, for example, is a carbon number range ranging from 1 to 20.

Although a one-part organopolysiloxane gel composition comprising a branched organopolysiloxane having a silicon-bonded aliphatic unsaturated group, an organohydrogenpolysiloxane having a silicon-bonded hydrogen atom at an end of the molecular chain, and a platinum group catalyst for promoting addition reaction cannot be stored at room temperature for a long term in the prior art, the present invention is successful in imparting long-term storage stability to the composition and also imparting good curability as compared with the prior art.

DESCRIPTION OF THE PREFERRED EMBODIMENTS

A. Vinyl-Containing Branched Organopolysiloxane

Component (A) is an organopolysiloxane which is used as a base polymer in the inventive composition. The organopolysiloxane consists of 80.0 to 97.0 mol % of $R_2SiO$ units, 1.0 to 10.0 mol % of $RSiO_{1.5}$ units, 0.1 to 4.0 mol % of $(CH_3)_2(CH_2\!=\!CH)SiO_{0.5}$ units, and 0.5 to 10.0 mol % of $(CH_3)_3SiO_{0.5}$ units, a total of these units being 100 mol %.

R which may be the same or different is methyl, phenyl or a group of the formula: $RfCH_2CH_2$— wherein Rf is a perfluoroalkyl group which may have an ether-bonding oxygen atom in the chain.

The perfluoroalkyl group Rf preferably has 1 to 12 carbon atoms, more preferably 1 to 8 carbon atoms when it does not contain an ether-bonding oxygen atom in the chain. $CF_3$—, $C_4F_9$— and $C_8F_{17}$— are exemplary.

When the perfluoroalkyl group Rf contains an ether-bonding oxygen atom in the chain, it is typically a group having the general formula (i):

$$R'O\!-\!(R''O\!-\!)_eR'''\!- \tag{i}$$

wherein R' is a perfluoroalkyl group of 1 to 4 carbon atoms, R" and R''' are independently perfluoroalkylene groups of 1 to 3 carbon atoms, and e is an integer of 0 to 10, Exemplary are groups of the formulae:

$C_2F_5O$—$(CF_2CF_2O)_f$—$CF_2$—, $C_3F_7O$—$(CF_2CF_2CF_2O)_g$—$CF_2CF_2$—, and $C_3F_7O$—$[CF(CF_3)CF_2O]_g$—$CF(CF_3)$— wherein f is an integer of 0 to 4, and g is an integer of 0 to 10.

In component (A), the trifunctional unit represented by the formula $RSiO_{1.5}$ is important in providing a branched structure to the organopolysiloxane and imparting moderate temperature behavior and fast curability to the inventive composition. The content of the trifunctional unit is 1.0 to 10.0 mol %, preferably 1.5 to 10.0 mol %. If the content of the trifunctional unit is too low, component (A) contains more straight structure and is thus provided with less of the above-described behavior and curability. If the content is too high, it becomes difficult to control the viscosity.

The monofunctional units represented by the formulae $(CH_3)_2(CH_2\!=\!CH)SiO_{0.5}$ and $(CH_3)_3SiO_{0.5}$ become terminal groups. The content of the former unit is 0.1 to 4.0 mol %, preferably 0.5 to 3.0 mol %. If this content is too low, the organopolysiloxane becomes less curable by addition reaction. If this content is too high, the cured product becomes less resistant to heat. The content of the latter unit is 0.5 to 10.0 mol %, preferably 0.8 to 8.0 mol %. The total content of the former and latter units is auto-determined by the content of the trifunctional unit of the formula $RSiO_{1.5}$ (that is, branched structure in component (A)).

The organopolysiloxane (A) may be prepared by any well-known method. For example, it is prepared by combining chlorosilanes corresponding to the respective units in a suitable molar ratio, and subjecting the mixture to cohydrolysis and condensation, or by effecting equilibration reaction among polysiloxanes and/or cyclic siloxane compounds having the structures of the respective units.

The organopolysiloxane (A) should preferably have a viscosity at 25° C. of 100 to 100,000 mPa.s, more preferably 300 to 10,000 mPa.s, even more preferably 400 to 5,000 mPa.s, most preferably 500 to 3,000 mPa.s. It is noted that the viscosity is measured at 25° C. by a rotational viscometer.

Illustrative, non-limiting examples of the organopolysiloxane (A) are given below.

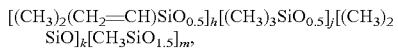

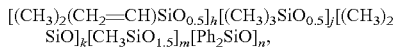

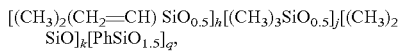

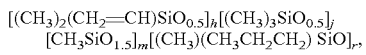

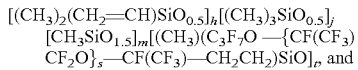

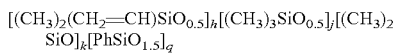

Note that h, j, k, m, n, p, q, r, s, and t each are a positive integer selected so as to provide a viscosity within the above-described range, and Ph is phenyl ($C_6H_5$).

These organopolysiloxanes may be used alone or in admixture of two or more.

B. SiH-Terminated Organohydrogenpolysiloxane

Component (B) is an organohydrogenpolysiloxane having per molecule at least one hydrogen atom directly bonded to a silicon atom at an end of the molecular chain, preferably at each of opposite ends of the molecular chain (that is, hydrogen atom bonded to a silicon atom (SiH group) in $R^1{}_2(H)SiO_{1/2}$ unit wherein $R^1$ is defined later), the number of silicon-bonded hydrogen atoms being preferably at least two (generally 2 to about 300), more preferably 2 to about 150. It serves as a crosslinker. Except the above-described condition, its molecular structure is not particularly limited. In addition to the silicon-bonded hydrogen atom at the end of the molecular chain, it may contain a hydrogen atom bonded to a silicon atom positioned midway the molecular chain (a SiH group at a non-terminal position). There can be used various structures including straight, branched and three-dimensional network (resinous) structures as is well known in the art. The total number of silicon-bonded hydrogen atoms (SiH groups) in component (B) is generally 1 to about 300, preferably 2 to about 300, and more preferably 2 to about 150 per molecule. The preferred organohydrogenpolysiloxane is represented by the average compositional formula (1).

$$R^1{}_aH_bSiO_{(4-a-b)/2} \quad (1)$$

Herein $R^1$ is a substituted or unsubstituted monovalent hydrocarbon group bonded to a silicon atom, preferably of 1 to 10 carbon atoms, the hydrocarbon group being free of aliphatic unsaturation. Examples of the hydrocarbon group include alkyl groups such as methyl, ethyl, propyl, isopropyl, butyl, isobutyl, tert-butyl, pentyl, neopentyl, hexyl, cyclohexyl, octyl, nonyl, and decyl; aryl groups such as phenyl, tolyl, xylyl and naphthyl; aralkyl groups such as benzyl, phenylethyl, and phenylpropyl; and 3,3,3-trifluoropropyl. Of these, alkyl groups, aryl groups and 3,3,3-trifluoropropyl are preferred, with methyl, phenyl and 3,3,3-trifluoropropyl being more preferred. In formula (1), a is a positive number of 0.7 to 2.2, b is a positive number of 0.001 to 1.0, and a+b is from 0.8 to 3.0. Preferably, a is a positive number of 1.0 to 2.1, especially 1.0 to 2.0, b is a positive number of 0.005 to 1.0, especially 0.01 to 1.0, and a+b is from 1.0 to 2.5, especially 1.5 to 2.2.

The molecular structure of the organohydrogenpolysiloxane may be straight, branched or three-dimensional network structure. In view of the characteristics of the resulting silicone gel and ease of handling of the composition, the number of silicon atoms per molecule (or degree of polymerization) is generally about 3 to about 1,000, preferably about 5 to about 400, more preferably about 10 to about 300. Favorable use is often made of an organohydrogenpolysiloxane which has a viscosity of about 1 to about 10,000 mPa.s, preferably about 3 to about 5,000 mPa.s, more preferably about 5 to about 3,000 mPa.s at 25° C., and which is liquid at room temperature (25° C.).

Illustrative, non-limiting examples of the organohydrogenpolysiloxane having the average compositional formula (2) include 1,1,3,3-tetramethyldisiloxane, tris(dimethylhydrogensiloxy)methylsilane, tris(dimethylhydrogensiloxy)phenylsilane, both end dimethylhydrogensiloxy-blocked dimethylpolysiloxane, both end dimethylhydrogensiloxy-blocked dimethylsiloxane-methylhydrogensiloxane copolymers, both end dimethylhydrogensiloxy-blocked methylhydrogensiloxane-dimethylsiloxane-diphenylsiloxane copolymers, copolymers composed of $(CH_3)_2HSiO_{1/2}$ units, $(CH_3)_3SiO_{1/2}$ units and $SiO_{4/2}$ units, copolymers composed of $(CH_3)_2HSiO_{1/2}$ units and $SiO_{4/2}$ units, and copolymers composed of $(CH_3)_2HSiO_{1/2}$ units, $SiO_{4/2}$ units and $(C_6H_5)_3SiO_{1/2}$ units. These organohydrogenpolysiloxanes may be used alone or in admixture of two or more.

Component (B) is added in an amount to provide 0.1 to 5 silicon-bonded hydrogen atoms (i.e., SiH groups) per alkenyl group in component (A), preferably 0.3 to 3 SiH groups per alkenyl group. If the number of SiH groups is less than 0.1, the composition will not cure, the crosslink density is too low, or the heat resistance of cured product is deleteriously affected. If the number of SiH groups is more than 5, a foaming problem arises from dehydrogenation and the heat resistance is deleteriously affected.

C. Addition Reaction Catalyst

Component (C) is an addition reaction catalyst which is obtained by heating and aging a mixture of components (C-1) to (C-3), prior to compounding with the other components of the composition. The catalyst promotes addition reaction of vinyl groups in component (A) and SiH groups in component (B), causing the composition to cure. The catalyst is an essential component to find a good compromise between long-term storage at room temperature and curability at moderate temperature.

Component (C-1) is a platinum complex which is per se known. It is a platinum complex having an alkenyl group-containing silane or alkenyl group-containing organosiloxane as a ligand, as disclosed, for example, in JP-B 46-28795 corresponding to DE 1668159, JP-B 51-8926, JP-B 55-423 corresponding to U.S. Pat. No. 3,814,730, and JP-A 56-136655 corresponding to U.S. Pat. No. 4,288,345, Examples include, but are not limited to, platinum/1,3-divinyl-1,1,3,3-tetramethyldisiloxane complex, and platinum/1,3,5,7-tetramethyl-1,3,5,7-tetravinylcyclotetrasiloxane complex. These platinum complexes may be used alone or in admixture of two or more.

Component (C-2) is a phosphite ester, typically a phosphite triester having the general formula (2) or (2'). The phosphite

functions to inhibit the catalysis of the catalyst (platinum or platinum group compound) on addition reaction at room temperature.

  (2)

Herein $R^2$ is independently at least one group selected from among substituted or unsubstituted monovalent hydrocarbon groups and groups of the formula: $-R^3-[O-P(OR^6)_2]_x$ wherein $R^6$ is independently a substituted or unsubstituted monovalent hydrocarbon group, x is an integer of 1 to 3, $R^3$ is a di- to tetra-valent hydrocarbon group of 2 to 20 carbon atoms, preferably 2 to 15 carbon atoms, more preferably 2 to 12 carbon atoms, which may have an ether-bonding oxygen atom in the chain.

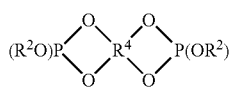  (2')

Herein $R^2$ is as defined above, $R^4$ is a tetravalent $C_1$-$C_{20}$ hydrocarbon group which may have an ether-bonding oxygen atom in the chain.

In formulae (2) and (2'), the monovalent hydrocarbon groups represented by $R^2$ and $R^6$ are preferably those of 1 to 20 carbon atoms, more preferably 1 to 15 carbon atoms, for example, alkyl groups such as methyl, ethyl, propyl and butyl, alkenyl groups such as vinyl, allyl and propenyl, cycloalkyl groups such as cyclohexyl, aryl groups such as phenyl and tolyl, aralkyl groups such as benzyl and β-phenylpropyl, and substituted forms of the foregoing groups in which some or all of the hydrogen atoms bonded to carbon atoms are replaced by halogen atoms, cyano groups or the like, such as chloromethyl, 3,3,3-trifluoropropyl and 2-cyanoethyl. Of the di- to tetra-valent hydrocarbon groups represented by $R^3$, exemplary divalent hydrocarbon groups include alkylene groups such as methylene, ethylene, propylene, butylene, and hexylene, and arylene groups such as 1,2-phenylene and 1,8-naphthylene. $R^4$ is a tetravalent hydrocarbon group of 1 to 20 carbon atoms, preferably 5 to 20 carbon atoms, more preferably 5 to 15 carbon atoms, which may have an ether-bonding oxygen atom in the chain.

Illustrative, non-limiting examples of the phosphite are given below. triethyl phosphite: $(EtO)_3P$ tris(2-ethylhexyl) phosphite: $[MeC_3H_6CH(Et)CH_2O]_3P$ triphenyl phosphite: $(PhO)_3P$ diphenyl mono(2-ethylhexyl)phosphite:$(PhO)_2(MeC_3H_6CH(Et)CH_2O)P$ tris(2,4-di-tert-butylphenyl)phosphite:

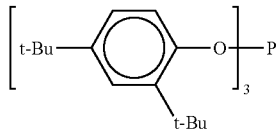

tetraphenyl dipropylene glycol diphosphite: $(PhO)_2PO-[CH(Me)-CH_2O]_2-P(OPh)_2$ tetraphenyl tetra(tridecyl)pentaerythritol tetraphosphite: $[(PhO)(C_{13}H_{27}O)P-OCH_2]_4C$ tetra(tridecyl)-4,4'-isopropylidene diphenyl diphosphite: $(C_{13}H_{27}O)_2PO-Ph-C(Me)_2-Ph-OP(OC_{13}H_{27})_2$ bis (tridecyl)pentaerythritol diphosphite:

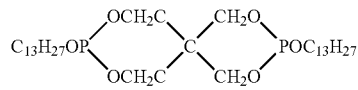

Note that Me, Et, Bu and Ph stand for methyl, ethyl, butyl and phenyl, respectively.

These phosphates may be used alone or in admixture of two or more.

The phosphate is used in an amount of 1 to 10 equivalents, preferably 1.5 to 6 equivalents of phosphorus (P) atoms per equivalent of platinum atoms (that is, 1 to 10 moles, preferably 1.5 to 6 moles of P atoms per mole of Pt atoms). On this basis, less than 1 equivalent of P atoms fails to inhibit the catalysis of the platinum group catalyst on addition reaction. More than 10 equivalents of P atoms fail to accomplish the desired brief cure at moderate temperature.

Component (C-3) is an organohydrogenpolysiloxane. Unlike the organohydrogenpolysiloxane (B) serving as a crosslinker, this organohydrogenpolysiloxane (C-3) is previously admixed with components (C-1) and (C-2) and heat aged together with them, so that it previously acts on platinum or platinum group compound for promoting addition reaction. In this sense, this organohydrogenpolysiloxane is essential to accomplish the desired brief cure at moderate temperature.

The organohydrogenpolysiloxane used herein has the average compositional formula (3):

  (3)

wherein $R^5$ is a substituted or unsubstituted monovalent hydrocarbon group free of aliphatic unsaturation, c is a positive number of 0.7 to 2.2, d is a positive number of 0.001 to 1.0, and c+d is from 0.8 to 3.0,The organohydrogenpolysiloxane has at least one hydrogen atom bonded to a silicon atom (SiH group) per molecule, the number of SiH groups being preferably at least 2 (generally 2 to about 300), more preferably at least 3 (especially 3 to about 150).

In formula (3), $R^5$ is a substituted or unsubstituted monovalent hydrocarbon group bonded to a silicon atom, preferably of 1 to 10 carbon atoms, the hydrocarbon group being free of aliphatic unsaturation. Examples of the hydrocarbon group include alkyl groups such as methyl, ethyl, propyl, isopropyl, butyl, isobutyl, tert-butyl, pentyl, neopentyl, hexyl, cyclohexyl, octyl, nonyl, and decyl; aryl groups such as phenyl, tolyl, xylyl and naphthyl; aralkyl groups such as benzyl, phenylethyl, and phenylpropyl; and 3,3,3-trifluoropropyl. Of these, alkyl groups, aryl groups and 3,3,3-trifluoropropyl are preferred, with methyl, phenyl and 3,3,3-trifluoropropyl being more preferred. In formula (3), c is a positive number of 0.7 to 2.2, d is a positive number of 0.001 to 1.0, and c+d is from 0.8 to 3.0. Preferably, c is a positive number of 1.0 to 2.1, especially 1.0 to 2.0, d is a positive number of 0.005 to 1.0, especially 0.01 to 1.0, and c+d is from 1.0 to 2.5, especially 1.5 to 2.2.

The molecular structure of the organohydrogenpolysiloxane may be straight, cyclic, branched or three-dimensional network structure. In view of the characteristics of the resulting silicone gel and ease of handling of the composition, the number of silicon atoms per molecule (or degree of polymerization) is generally about 3 to about 1,000, preferably about 5 to about 400, more preferably about 10 to about 300,Favorable use is often made of an organohydrogenpolysiloxane which has a viscosity of about 1 to about 10,000 mPa.s, preferably about 3 to about 5,000 mPa.s, more preferably about 5 to about 3,000 mPa.s at 25° C., and which is liquid at room temperature (25° C.). The silicon-bonded hydrogen atom (SiH group) may be positioned at an end or a midway (non-terminal) position of the molecular chain or both.

Illustrative, non-limiting examples of the organohydrogenpolysiloxane having the average compositional formula (3) include 1,1,3,3-tetramethyldisiloxane, 1,3,5,7-tetramethylcyclotetrasiloxane, tris(dimethylhydrogensiloxy)methylsilane, tris(dimethylhydrogensiloxy)phenylsilane, both end dimethylhydrogensiloxy-blocked dimethylpolysiloxane, both end dimethylhydrogensiloxy-blocked dimethylsiloxane-methylhydrogensiloxane copolymers, both end dimethylhydrogensiloxy-blocked methylhydrogensiloxane-dimethylsiloxane-diphenylsiloxane copolymers, both end trimethylsiloxy-blocked methylhydrogenpolysiloxane, both end trimethylsiloxy-blocked dimethylsiloxane-methylhydrogensiloxane copolymers, copolymers composed of $(CH_3)_2HSiO_{1/2}$ units, $(CH_3)_3SiO_{1/2}$ units and $SiO_{4/2}$ units, copolymers composed of $(CH_3)_2HSiO_{1/2}$ units and $SiO_{4/2}$ units, and copolymers composed of $(CH_3)_2HSiO_{1/2}$ units, $SiO_{4/2}$ units and $(C_6H_5)_3SiO_{1/2}$ units. These organohydrogenpolysiloxanes may be used alone or in admixture of two or more. Among others, an organohydrogenpolysiloxane having a silicon-bonded hydrogen atom (SiH group) at the end of the molecular chain is desirable.

The organohydrogenpolysiloxane (C-3) may be the same as or different from the organohydrogenpolysiloxane (B).

The organohydrogenpolysiloxane (C-3) is used in an amount to provide 1 to 100 equivalents, preferably 1.5 to 50 equivalents of silicon-bonded hydrogen atoms (SiH groups) per equivalent of platinum atoms in component (C-1) (that is, 1 to 100 moles, preferably 1.5 to 50 moles of SiH groups per mole of Pt atoms). Less than 1 equivalent of SiH groups per equivalent of platinum atoms fails to insure the cure at moderate temperature of the composition whereas more than 100 equivalents of SiH groups per equivalent of platinum atoms adversely affects the storage stability at room temperature of composition.

The addition reaction catalyst (C) is obtained by combining predetermined amounts of components (C-1), (C-2) and (C-3), and heating and aging the mixture at a temperature of 30 to 120° C., preferably 40 to 100° C. This addition reaction catalyst ensures that the composition exhibits storage stability at room temperature and brief cure at moderate temperature. If the heat aging temperature is below 30° C., the catalyst is less effective for allowing the composition to cure. A heat aging temperature above 120° C. can deactivate the platinum complex itself. The heat aging time is preferably about 1 to about 200 hours, more preferably about 4 to about 100 hours. With too short a heat aging time, the addition reaction catalyst may become less stable on storage. With too long a heat aging time, the composition may become less stable on storage.

The amount of component (C) compounded in the inventive composition may be a catalytic amount, and generally in a range of about 0.1 to about 1,000 ppm, preferably about 0.5 to about 100 ppm, more preferably about 1 to about 50 ppm of platinum atoms based on the total weight of components (A) and (B). If the amount of component (C) is too small, the addition reaction may be retarded or may not take place. If the amount of component (C) is too large, the cured polysiloxane composition becomes less resistant to heat and uneconomical because of the expensiveness of platinum.

D. Organic Peroxide

Component (D) is an organic peroxide. During long-term storage of the composition at room temperature, the organic peroxide has a function of effectively inhibiting the catalysis of the platinum catalyst on addition reaction along with component (C-2). At the heat curing stage, the organic peroxide decomposes at its decomposition temperature, losing its own inhibitory action, and oxidizes component (C-2), thus causing component (C-2) to lose the inhibitory action. This ensures that the composition cures rapidly with the aid of the platinum group catalyst.

Examples of suitable organic peroxides include, but are not limited to, ketone peroxides such as methyl ethyl ketone peroxide, cyclohexanone peroxide, methyl acetoacetate peroxide, and acetylacetone peroxide; peroxyketals such as 1,1-di(t-butylperoxy)cyclohexane, 1,1-bis(t-tubylperoxy)-3,3,5-trimethylcyclohexane, and 2,2-bis(t-tubylperoxy)butane; hydroperoxides such as 1,1,3,3-tetramethylbutyl hydroperoxide, cumene hydroperoxide, and t-butyl hydroperoxide; dialkyl peroxides such as 2,5-dimethyl-2,5-bis(t-butylperoxy)hexane and di-t-butyl peroxide; diacyl peroxides such as 3,5,5-trimethylhexanoyl peroxide and m-toluyl peroxide; peroxy carbonates such as diisopropylperoxy dicarbonate and di-2-ethylhexylperoxy dicarbonate; and peroxy esters such as t-butylperoxy 3,5,5-trimethylhexanoate, t-butylperoxy isopropyl monocarbonate, t-butylperoxy 2-ethylhexyl monocarbonate, and t-butyl peroxybenzoate. These peroxides may be used alone or in admixture of two or more.

The amount of organic peroxide (D) compounded is to provide at least 2 equivalents, preferably at least 3 equivalents of peroxide linkage (—OO— linkage) per equivalent of phosphite (C-2). Specifically, an organic peroxide having one —OO— linkage is compounded in an amount of at least 2 moles, preferably at least 3 moles per mole of phosphorus atom, and an organic peroxide having two —OO— linkages is compounded in an amount of at least 1 mole, preferably at least ½ moles per mole of phosphorus atom. If the amount of organic peroxide is less than 2 equivalents, it fails to inhibit the catalysis of the platinum group catalyst on addition reaction at room temperature and also fails to cause component (C-2) to deactivate or lose its catalysis inhibitory effect at the heat curing stage. The upper limit of the amount of organic peroxide is not critical and is usually about 500 equivalents because decomposition resides can affect the curing properties.

Other Components

In addition to the above-described components (A) to (D), various optional components may be compounded in the inventive composition. Typical are inorganic fillers including fumed silica, crystalline silica, precipitated silica, hollow fillers, silsesquioxane, fumed titanium dioxide, magnesium oxide, zinc oxide, iron oxide, aluminum hydroxide, magnesium carbonate, calcium carbonate, zinc carbonate, laminar mica, carbon black, diatomaceous earth, and glass fibers. These fillers may be surface treated with organosilicon compounds such as organoalkoxysilane compounds, organochlorosilane compounds, organosilazane compounds, and low-molecular-weight siloxane compounds. Silicone rubber powder and silicone resin powder may also be compounded.

Other optional components include linear organopolysiloxanes containing alkenyl groups, organopolysiloxanes free of silicon-bonded hydrogen atoms and alkenyl groups, heat resistance modifiers, flame retardants, thixotropic agents, pigments and dyes. These optional components are compounded so long as they do not compromise the objects of the invention.

The organopolysiloxane gel composition of the invention may be obtained by mixing the above-described components (A) to (D) and various optional components in a conventional manner. The method of molding the organopolysiloxane gel composition of the invention is not particularly limited. Conventional molding methods may be used. Preferred curing conditions include a temperature of 60 to 200° C., especially 80 to 160° C. and a time of 0.1 to 48 hours, especially 0.5 to 24 hours.

EXAMPLE

Examples are given below by way of illustration and not by way of limitation. Note that all parts (pbw) and % are by weight. The viscosity is measured at 25° C. by a rotational viscometer.

Example 1

An addition reaction catalyst was prepared by combining 5 parts of a dimethylpolysiloxane solution containing 1% (calculated as platinum atoms) of a chloroplatinic acid/1,3-divinyltetramethyldisiloxane complex, 0.21 part (2 equivalents per equivalent of platinum atoms) of tris(2-ethylhexyl) phosphate, and 0.5 part (2.6 equivalents of silicon-bonded hydrogen atoms per equivalent of platinum atoms) of a both end dimethylhydrogensiloxy-blocked dimethylpolysiloxane represented by the general formula (4):

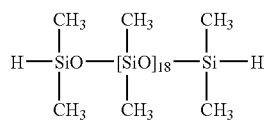

(4)

and having a viscosity of 20 mPa.s at 25° C., and heat aging the mixture at 80° C. for 24 hours.

To 100 parts of an organopolysiloxane consisting of $CH_2=CH(CH_3)_2SiO_{0.5}$, $(CH_3)_3SiO_{0.5}$, $(CH_3)_2SiO$ and $CH_3SiO_{1.5}$ units in a molar ratio of 0.75/1.75/95/2.5 mol % and having a viscosity of 900 mPa.s at 25° C. were added 8 parts of the organohydrogenpolysiloxane of formula (4) (the ratio of silicon-bonded hydrogen atoms to silicon-bonded alkenyl groups, [SiH groups/alkenyl groups], is 1.0), 0.03 part of 1,1-di(tert-butylperoxy)cyclohexane, and an amount (to provide 5 ppm of platinum atoms) of the above addition reaction catalyst. The ingredients were uniformly mixed to form a silicone gel composition.

The silicone gel composition was cured under three sets of conditions: 100° C./1 hr, 120° C./30 min, and 150° C./30 min. The cured samples were measured for hardness (indentation) according to the consistency test of JIS K-2220 using a ¼ cone. Also the composition was held at 40° C. for 3 weeks, after which it was examined for storage stability.

Example 2

An addition reaction catalyst was prepared as in Example 1 except that 0.4 part (19 equivalents of silicon-bonded hydrogen atoms per equivalent of platinum atoms) of a both end trimethylsiloxy-blocked methylhydrogenpolysiloxane represented by the general formula (5):

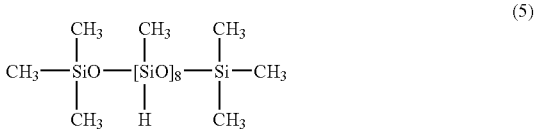

(5)

and having a viscosity of 5 mPa.s at 25° C. was used instead of 0.5 part of the both end dimethylhydrogensiloxy-blocked dimethylpolysiloxane of formula (4) as component (C-3). A uniform silicone gel composition was similarly prepared using this addition reaction catalyst. It was examined for penetration and storage stability.

Example 3

An addition reaction catalyst was prepared as in Example 1 except that 0.27 part (3 equivalents per equivalent of platinum atoms) of diphenyl mono(2-ethylhexyl)phosphite was used instead of the tris(2-ethylhexyl)phosphite and the mixture was heat aged at 40° C. for 6 days. A uniform silicone gel composition was similarly prepared using this addition reaction catalyst. It was examined for penetration and storage stability.

Comparative Example 1

An addition reaction catalyst was prepared as in Example 1 except that the mixture was allowed to stand in a room temperature (25° C.) atmosphere for 24 hours instead of the heat aging at 80° C. A uniform silicone gel composition was similarly prepared using this addition reaction catalyst. It was examined for penetration and storage stability.

Comparative Example 2

An addition reaction catalyst was prepared as in Example 1 except that the mixture was heat aged at 150° C. for 4 hours. A uniform silicone gel composition was similarly prepared using this addition reaction catalyst. It was examined for penetration and storage stability.

Comparative Example 3

An addition reaction catalyst was prepared as in Example 1 except that the both end dimethylhydrogensiloxy-blocked dimethylpolysiloxane of formula (4) as component (C-3) was omitted. A uniform silicone gel composition was similarly prepared using this addition reaction catalyst. It was examined for penetration and storage stability.

Comparative Example 4

An addition reaction catalyst was prepared as in Example 1 except that the tris(2-ethylhexyl)phosphite was omitted. A uniform silicone gel composition was similarly prepared using this addition reaction catalyst. It was examined for penetration and storage stability.

Comparative Example 5

An addition reaction catalyst was prepared as in Example 1 except that the amount of tris(2-ethylhexyl)phosphite was 1.5 parts (14 equivalents per equivalent of platinum atoms). A uniform silicone gel composition was similarly prepared using this addition reaction catalyst. It was examined for penetration and storage stability.

Comparative Example 6

An addition reaction catalyst was prepared as in Example 2 except that the amount of both end trimethylsiloxy-blocked methylhydrogenpolysiloxane of formula (5) was 3.0 parts (146 equivalents of silicon-bonded hydrogen atoms per equivalent of platinum atoms). A uniform silicone gel composition was similarly prepared using this addition reaction catalyst. It was examined for penetration and storage stability.

The cured property and storage stability of the nine silicone gel compositions are summarized in Table 1.

TABLE 1

|  | Example | | | Comparative Example | | | | | |
| --- | --- | --- | --- | --- | --- | --- | --- | --- | --- |
|  | 1 | 2 | 3 | 1 | 2 | 3 | 4 | 5 | 6 |
| Equivalent[1] of phosphite | 2 | 2 | 3 | 2 | 2 | 2 | — | 14 | 2 |
| Equivalent[1] of SiH in catalyst | 2.6 | 19 | 2.6 | 2.6 | 2.6 | — | 2.6 | 2.6 | 146 |
| Aging conditions Temp. | 80° C. | 80° C. | 40° C. | 25° C. | 150° C. | 80° C. | 80° C. | 80° C. | 80° C. |
| Time | 24 hr | 24 hr | 144 hr | 24 hr | 4 hr | 24 hr | 24 hr | 24 hr | 24 hr |
| Equivalent[2] of peroxide | 46 | 46 | 29 | 46 | 46 | 46 | — | 6.6 | 46 |
| Test results | | | | | | | | | |
| Hardness[3] Cured @ 150° C./30 min | 85 | 78 | 88 | 85 | 90 | 85 | 83 | uncured | 71 |
| Cured @ 120° C./30 min | 85 | 80 | 87 | uncured | uncured | uncured | 83 | uncured | 73 |
| Cured @ 100° C./1 hr | 88 | 81 | 87 | uncured | uncured | uncured | 83 | uncured | 77 |
| Storage stability[4] @ 40° C./3 weeks | OK | OK | OK | OK | OK | OK | NG | OK | NG |

[1]per equivalent of platinum atoms
[2]number of peroxide linkages per equivalent of phosphite
[3]hardness (penetration) according to the consistency test (¼ cone) of JIS K-2220
[4]viscosity buildup by accelerated degradation at 40° C.
OK: viscosity after storage is 1.0 to less than 2 times the initial viscosity
NG: viscosity after storage is at least 2 times the initial viscosity Japanese Patent Application No. 2004-245345 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method of preparing one-part organopolysiloxane gel composition comprising the steps of:
heating and aging a mixture of components (C-1) to (C-3) at a temperature of 40° C. to 120° C. for about 1 hour to about 200 hours to prepare (C) an addition reaction catalyst:
(C-1) a platinum complex having an alkenyl group-containing silane or alkenyl group-containing organosiloxane as a ligand, in an amount of 1 equivalent of platinum atoms in the platinum complex,
(C-2) a phosphite having the general formula (2):

$$P(OR^2)_3 \tag{2}$$

wherein $R^2$ is independently at least one group selected from the class consisting of a substituted or unsubstituted monovalent hydrocarbon group and a group of the formula: $-R^3-[O-P(OR^6)_2]_x$ wherein $R^6$ is independently a substituted or unsubstituted monovalent hydrocarbon group, x is an integer of 1 to 3, $R^3$ is a di- to tetra-valent $C_2$-$C_{20}$ hydrocarbon group which may have an ether-bonding oxygen atom in the chain, or the general formula (2'):

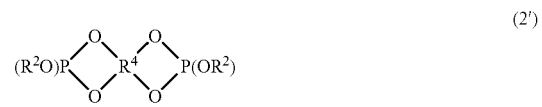

wherein $R^2$ is as defined above, $R^4$ is a tetravalent $C_1$—$C_{20}$ hydrocarbon group which may have an ether-bonding oxygen atom in the chain, in an amount of 1 to 10 equivalents of phosphorus atoms, and
(C-3) an organohydrogenpolysiloxane represented by the average compositional formula (3):

$$R^5_c H_d SiO_{(4-c-d)/2} \tag{3}$$

wherein $R^5$ is a substituted or unsubstituted monovalent hydrocarbon group free of aliphatic unsaturation, c is a positive number of 0.7 to 2.2, d is a positive number of 0.001 to 1.0, and c+d is from 0.8 to 3.0, said organohydrogenpolysiloxane having at least one hydrogen atom bonded to a silicon atom, in an amount of 1 to 100 equivalents of silicon-bonded hydrogen atoms, and
mixing the following components (A) to (D):
(A) 100 parts by weight of an organopolysiloxane consisting of 80.0 to 97.0 mol% of $R_2SiO$ units, 1.0 to 10.0 mol% of $RSiO_{1.5}$ units, 0.1 to 4.0 mol% of $(CH_3)_2(CH_2=CH)SiO_{0.5}$ units, and 0.5 to 10.0 mol% of $(CH_3)_3SiO_{0.5}$ units, a total of these units being 100 mol%, wherein R is methyl, phenyl or a group of the formula: $RfCH_2CH_2-$, Rf is a perfluoroalkyl group which may have an ether-bonding oxygen atom in the chain, a plurality of R's in one molecule may be the same or different, (B) an organohydrogenpolysiloxane represented by the average compositional formula (1):

wherein $R^1$ is a substituted or unsubstituted monovalent hydrocarbon group free of aliphatic unsaturation, a is a positive number of 0.7 to 2.2, b is a positive number of 0.001 to 1.0, and a+b is from 0.8 to 3.0, said organohydrogenpolysiloxane having at least one hydrogen atom directly bonded to a silicon atom at an end of the molecular chain, in an amount to provide 0.1 to 5 silicon-bonded hydrogen atoms per vinyl group in component (A), (C) the addition reaction catalyst obtained as set forth above in an amount to provide 0.1 to 1,000 ppm of platinum atoms based on the total weight of components (A) and (B), and (D) an organic peroxide in an amount of at least 2 equivalents per equivalent of the phosphite in component (C).

2. The method of claim 1 wherein in component (C), the organohydrogenpolysiloxane of formula (3) has a hydrogen atom bonded to a silicon atom at an end of the molecular chain.

3. The method of claim 1 wherein the heat aging time is about 4 hours to about 200 hours.

4. The method of claim 1 wherein the heat aging temperature is 80° C. to 120° C.

5. A method of preparing an organopolysiloxane gel cured product, comprising preparing a one-part organopolysiloxane gel composition by the steps of:

heating and aging a mixture of components (C-1) to (C-3) at a temperature of 40° C. to 120° C. for about 1 hour to about 200 hours to prepare (C) an addition reaction catalyst:

(C-1) a platinum complex having an alkenyl group-containing silane or alkenyl group-containing organosiloxane as a ligand, in an amount of 1 equivalent of platinum atoms in the platinum complex, (C-2) a phosphite having the general formula (2):

$$P(OR^2)_3 \quad (2)$$

wherein $R^2$ is independently at least one group selected from the class consisting of a substituted or unsubstituted monovalent hydrocarbon group and a group of the formula: $-R^3-[O-P(OR^6)_2]_x$ wherein $R^6$ is independently a substituted or unsubstituted monovalent hydrocarbon group, x is an integer of 1 to 3, $R^3$ is a di- to tetra-valent $C_2$-$C_{20}$ hydrocarbon group which may have an ether-bonding oxygen atom in the chain, or the general formula (2'):

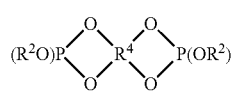
(2')

wherein $R^2$ is as defined above, $R^4$ is a tetravalent $C_1$-$C_{20}$ hydrocarbon group which may have an ether-bonding oxygen atom in the chain, in an amount of 1 to 10 equivalents of phosphorus atoms, and (C-3) an organohydrogenpolysiloxane represented by the average compositional formula (3):

wherein $R^5$ is a substituted or unsubstituted monovalent hydrocarbon group free of aliphatic unsaturation, c is a positive number of 0.7 to 2.2, d is a positive number of 0.001 to 1.0, and c+d is from 0.8 to 3.0, said organohydrogenpolysiloxane having at least one hydrogen atom bonded to a silicon atom, in an amount of 1 to 100 equivalents of silicon-bonded hydrogen atoms, and mixing the following components (A) to (D):

(A) 100 parts by weight of an organopolysiloxane consisting of 80.0 to 97.0 mol% of $R_2SiO$ units, 1.0 to 10.0 mol% of $RSiO_{1.5}$ units, 0.1 to 4.0 mol% of $(CH_3)_2(CH2=CH)SiO_{0.5}$ units, and 0.5 to 10.0 mol% of $(CH_3)_3SiO_{0.5}$ units, a total of these units being 100 mol%, wherein R is methyl, phenyl or a group of the formula: $RfCH_2CH_2$-, Rf is a perfluoroalkyl group which may have an ether-bonding oxygen atom in the chain, a plurality of R's in one molecule may be the same or different, (B) an organohydrogenpolysiloxane represented by the average compositional formula (1):

wherein $R^1$ is a substituted or unsubstituted monovalent hydrocarbon group free of aliphatic unsaturation, a is a positive number of 0.7 to 2.2, b is a positive number of 0.001 to 1.0, and a+b is from 0.8 to 3.0, said organohydrogenpolysiloxane having at least one hydrogen atom directly bonded to a silicon atom at an end of the molecular chain, in an amount to provide 0.1 to 5 silicon-bonded hydrogen atoms per vinyl group in component (A), (C) the addition reaction catalyst obtained as set forth above in an amount to provide 0.1 to 1,000 ppm of platinum atoms based on the total weight of components (A) and (B), and (D) an organic peroxide in an amount of at least 2 equivalents per equivalent of the phosphite in component (C), and heating and curing said organopolysiloxane gel composition.

* * * * *